United States Patent
Deshpande et al.

(10) Patent No.: US 8,909,236 B2
(45) Date of Patent: Dec. 9, 2014

(54) PROVISIONING FEMTOCELL DEPLOYMENT INFORMATION

(75) Inventors: Manoj M. Deshpande, San Diego, CA (US); Young C. Yoon, San Diego, CA (US); Srinivasan Balasubramanian, San Diego, CA (US); Jen Mei Chen, San Diego, CA (US); Peerapol Tinnakornsrisuphap, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 900 days.

(21) Appl. No.: 12/542,573

(22) Filed: Aug. 17, 2009

(65) Prior Publication Data

US 2010/0048217 A1 Feb. 25, 2010

Related U.S. Application Data

(60) Provisional application No. 61/091,230, filed on Aug. 22, 2008.

(51) Int. Cl.
| | |
|---|---|
| *H04W 40/00* | (2009.01) |
| *H04J 11/00* | (2006.01) |
| *H04W 48/16* | (2009.01) |
| *H04W 48/08* | (2009.01) |

(52) U.S. Cl.
CPC .......... *H04W 48/16* (2013.01); *H04J 11/0069* (2013.01); *H04W 48/08* (2013.01)
USPC ..... 455/446; 436/444; 436/456.3; 436/435.1; 436/448; 436/451

(58) Field of Classification Search
CPC ..... H04W 16/00; H04W 16/02; H04W 16/12; H04W 16/18; H04W 16/20; H04W 16/24
USPC ........... 455/436, 444, 456.3, 446, 435.1, 448, 455/451
See application file for complete search history.

(56) References Cited

U.S. PATENT DOCUMENTS

| 7,505,433 B2 | 3/2009 | Yaqub et al. |
| 7,509,122 B2 | 3/2009 | Xue et al. |

(Continued)

FOREIGN PATENT DOCUMENTS

| CN | 1969529 A | 5/2007 |
| EP | 1819184 A1 | 8/2007 |

(Continued)

OTHER PUBLICATIONS

International Search Report and Written Opinion—PCT/US2009/054686, International Search Authority—European Patent Office—Dec. 9, 2009-12-09.

(Continued)

*Primary Examiner* — Amancio Gonzalez
(74) *Attorney, Agent, or Firm* — Fariba Yadegar-Bandari

(57) ABSTRACT

Systems and methodologies are described that facilitate provisioning cell information to mobile devices via provisioning mechanisms. The cell information relates to cell characteristics within a wireless communication network. The cell information can be stored on the mobile devices and employed to detect the cell characteristics and adjust the handoff behavior based at least in part on characteristics of signals received from one or more base stations.

43 Claims, 14 Drawing Sheets

(56) References Cited

U.S. PATENT DOCUMENTS

| | | | |
|---|---|---|---|
| 8,000,709 B2* | 8/2011 | Burgess et al. | 455/436 |
| 2005/0037798 A1 | 2/2005 | Yamashita et al. | |
| 2006/0068780 A1* | 3/2006 | Dalsgaard et al. | 455/432.3 |
| 2007/0123265 A1 | 5/2007 | Moon | |
| 2007/0191005 A1 | 8/2007 | Cooper et al. | |
| 2008/0049702 A1 | 2/2008 | Meylan et al. | |
| 2008/0108353 A1 | 5/2008 | Lee et al. | |

FOREIGN PATENT DOCUMENTS

| | | |
|---|---|---|
| JP | 2002027522 A | 1/2002 |
| JP | 2004159304 A | 6/2004 |
| JP | 2005277507 A | 10/2005 |
| JP | 2006197603 A | 7/2006 |
| JP | 2006311329 A | 11/2006 |
| JP | 2007043573 A | 2/2007 |
| JP | 2007097122 A | 4/2007 |
| JP | 2007221786 A | 8/2007 |
| JP | 2008118404 A | 5/2008 |
| WO | WO 2008030956 | 3/2008 |

OTHER PUBLICATIONS

Taiwan Search Report—TW098128426—TIPO—Feb. 3, 2013.

3GPP2: "Over-the-Air Service Provisioning of Mobile Stations in Spread Spectrum Standards", 3GPP2 C.S0016-C, Version 1.0, Release C, Oct. 22, 2004, pp. 1-312.

Airvana, et al., "Editorial Update of Stage 3 Text for Femto-Cell Enhanced System Selection w/ Simplified PUZL," C14-20080512-006r1, 2008.

Airvana, et al., "Femto Related Provisioning Enhancements for Enhanced System Selection (ESS) for Femto Cells—Update," C14-20080331-009r2, 2008.

Airvana, et al., "Proposed Modifications for Femto-Cell Enhanced System Selection w/ Simplified PUZL—Stage 3," C14-20080721-014, 2008, 5 pages.

C22-20080825-015, "Stage 3 changes for cdma2000 1x Signaling Enhancements for Femto AP Support," C20-20080825-028_QC_1x_femto_support (Stage 3), 2008, 67 pages.

C22-20080825-016, "cdma2000 1x Signaling Enhancements for Femto AP Support_update (Stage 2)," 2008, 18 pages.

3GPP TS 22.011: "3rd Generation Partnership Project; Technical Specification Group Services and System Aspects; Service accessibility", Release 8, Version 8.4.0, Jun. 2008, pp. 1-25.

NTT DoCoMo et al., "Cell ID Assignment for Home Node B" 3GPP Draft; R1-073684 Cell ID Assignment for Home Node B, 3rd Generation Partnership Project (3GPP), Mobile Competence Centre ; 650, Route Des Lucioles ; F-06921 Sophia-Antipolis Cedex ; France, vol. RAN WG1, no. Athens, Greece; Aug. 15, 2007, XP050107280 [retrieved on Aug. 15, 2007] pp. 2-4.

Qualcomm Europe: "UTRA HNB Idle Mode (Re)selection," 3GPP Draft TSG-RAN WG2 #62bis, R2-084347, 3rd Generation Partnership Project (3GPP), Jeju, Korea, Aug. 2008, XP050319423, pp. 1-4.

* cited by examiner

PROVISIONING FEMTOCELL DEPLOYMENT INFORMATION

CROSS-REFERENCE TO RELATED APPLICATIONS

This application claims the benefit of U.S. Provisional Patent application Ser. No. 61/091,230 entitled "SYSTEMS AND METHODS TO CONVEY FEMTO CELL DEPLOYMENT INFORMATION TO MOBILE STATIONS USING PROVISIONING ALGORITHMS" which was filed Aug. 22, 2008. The entirety of the aforementioned application is hereby incorporated by reference.

BACKGROUND

I. Field

The following description relates generally to wireless communications, and more particularly to enabling mobile devices to store provisioned deployment information to facilitate selection of femtocells.

II. Background

Wireless communication systems are widely deployed to provide various types of communication content such as voice and data. Typical wireless communication systems may be multiple-access systems capable of supporting communication with multiple users by sharing available system resources (e.g., bandwidth, transmit power, ...). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP2, 3GPP long-term evolution (LTE), LTE Advanced (LTE-A), etc.

As the demand for high-rate and multimedia data services rapidly grows, there has been an effort toward implementation of efficient and robust communication systems with enhanced performance. For example, in recent years, users have started to replace fixed line communications with mobile communications and have increasingly demanded great voice quality, reliable service, and low prices.

In addition to mobile telephone networks currently in place, a new class of small base stations has emerged, which can be installed in the home of a user and provide indoor wireless coverage to mobile units using existing broadband Internet connections. Such personal miniature base stations are generally known as access point base stations, or, alternatively, Home Node B (HNB) or Femto cells. Typically, such miniature base stations are connected to the Internet and the network of a mobile operator via a Digital Subscriber Line (DSL) router, cable modem, or the like.

Wireless communication systems can be configured to include a series of wireless access points, which can provide coverage for respective locations within the system. Such a network structure is generally referred to as a cellular network structure, and access points and/or the locations they respectively serve in the network are generally referred to as cells. The networks can include femtocells as well as macrocells that cover larger areas. Because the strength of a signal typically decreases as the distance over which it is communicated increases, a network user can, under various circumstances, exchange substantially strong signals with cells located physically close to the user as compared to cells that are located farther away from the user. However, in the case of femtocells, a strong signal can be temporary due to mobility of a mobile device and the relatively smaller coverage area of femtocells. For instance, a high-mobility network user can quickly enter and exit a femtocell coverage area. Unnecessary battery and/or radio resources can be utilized in acquisition of the femtocell since it is unknown that the strong signal originates from a femtocell.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to an aspect, a method for utilizing cell information provisioned to a mobile device is described herein. The method can comprise obtaining cell information that includes network information, deployment information and cell characteristic information of one or more cells within a network, wherein the cell information further provides mappings between the network information, the deployment information, and the cell characteristic information. The method can also include retaining the cell information in a memory. In addition, the method can comprise employing the cell information to facilitate discovery of cell characteristics associated with at least one detected cell.

A second aspect described herein relates to an apparatus. The apparatus can include a receive module that acquires cell information, wherein the cell information includes network information, deployment information and cell characteristic information of one or more cells within a network, wherein the cell information further provides mappings between the network information, the deployment information, and the cell characteristic information. The apparatus can further comprise a cell evaluation module that utilizes the cell information to facilitate discovery of cell characteristics associated with the one or more cells based at least in part on characteristics of received signals from the one or more cells, the cell evaluation module correlates characteristics of received signals to network information, deployment information and cell characteristic information specified in the cell information.

A third aspect relates to a wireless communication apparatus. The wireless communication apparatus can comprise means for obtaining cell information that includes network information, deployment information and cell characteristic information of one or more cells within a network, wherein the cell information further provides mappings between the network information, the deployment information, and the cell characteristic information. The wireless communication apparatus can also include means for storing the cell information in a memory. In addition, the wireless communication apparatus can comprise means for employing the cell information to identify cell characteristics associated with at least one detected cell.

A fourth aspect described herein relates to computer program product, which can comprise a computer-readable medium that comprises code for causing at least one computer to acquire cell information from at least one base station via over-the-air provisioning, wherein the cell information includes network information, deployment information and cell characteristic information of one or more cells within a network, wherein the cell information further provides mappings between the network information, the deployment information, and the cell characteristic information. The computer-readable medium can further include code for causing at least one computer to retain the cell information. The computer-readable medium can also comprise code for causing at least one computer to analyze a signal from a base station to determine one or more properties of the base station. In addition, the computer-readable medium can include code for causing at least one computer to correlate the one or more properties of the base station with the cell information to identify cell characteristics associated with the base station.

A fifth aspect relates to a wireless communication apparatus comprising a processor configured to obtain cell information includes network information, deployment information and cell characteristic information of one or more cells within a network, wherein the cell information further provides mappings between the network information, the deployment information. The processor can further be configured to store the cell information in a memory. In addition, the processor can be configured to utilize the cell information to discover cell characteristics associated with at least one detected cell.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
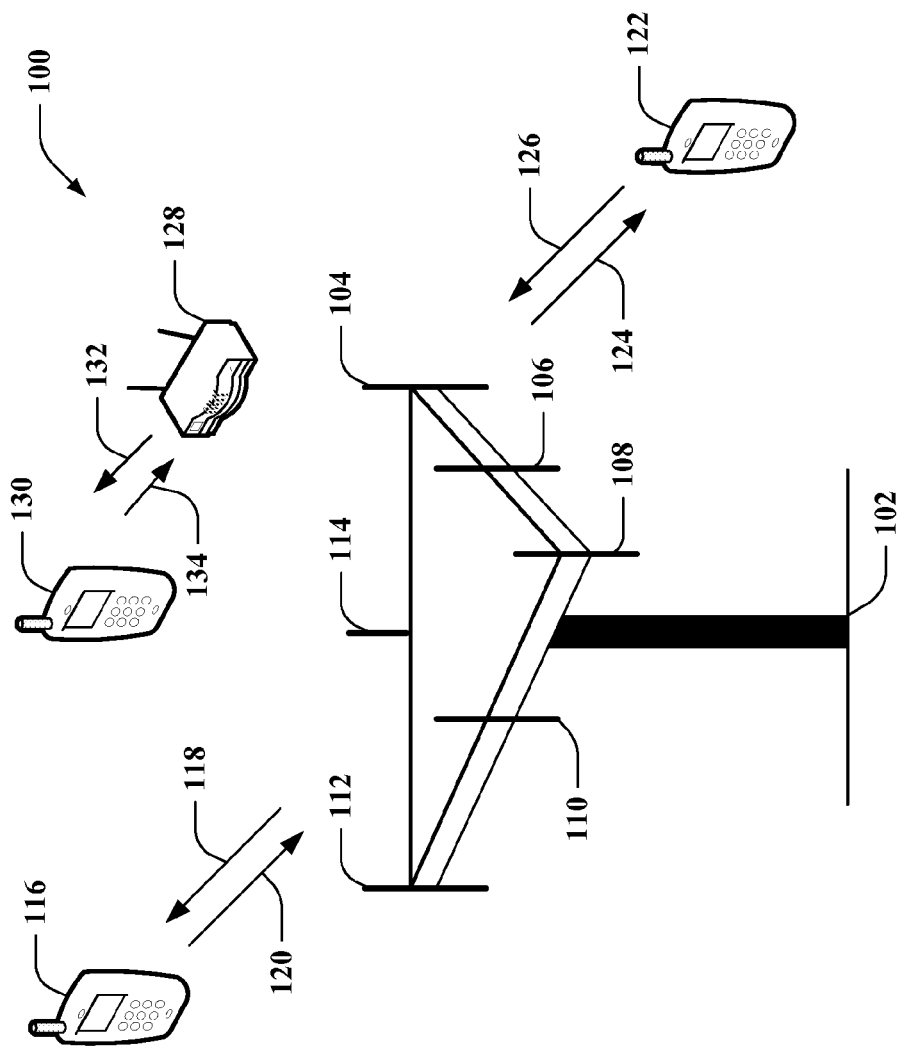
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to computer-related entities such as: hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as, in accordance with a signal, having one or more data packets (e.g., data from one component interacting with another component in a local system, distributed system, and/or across a network such as the Internet with other systems by way of the signal).

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g. access point, Node B, or evolved Node B (eNB)) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects will be presented in terms of systems that can include a number of devices, components, modules, and the like. It is to be understood and appreciated that the various systems can include additional devices, components, modules, etc. and/or not include all of the devices, components, modules etc. discussed in connection with the figures. A combination of these approaches can also be used.

Referring now to FIG. 1, a wireless communication system 100 is illustrated in accordance with various embodiments presented herein. System 100 comprises a base station (e.g., access point) 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more UEs such as UE 116 and UE 122; however, it is to be appreciated that base station 102 can communicate with substantially any number of UEs similar to UEs 116 and 122. UEs 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, UE 116 is in communication with antennas 112 and 114, where antennas 112 and 114 transmit information to UE 116 over a downlink 118 and receive information from UE 116 over an uplink 120. Moreover, UE 122 is in communication with antennas 104 and 106, where antennas 104 and 106 transmit information to UE 122 over a downlink 124 and receive information from UE 122 over an uplink 126. In a frequency division duplex (FDD) system, downlink 118 can utilize a different frequency band than that used by uplink 120, and downlink 124 can employ a different frequency band than that employed by uplink 126, for example. Further, in a time division duplex (TDD) system, downlink 118 and uplink 120 can utilize a common frequency band and downlink 124 and uplink 126 can utilize a common frequency band.

Each group of antennas and/or the area in which they are designated to communicate can be referred to as a sector of base station 102. For example, antenna groups can be designed to communicate to UEs in a sector of the areas covered by base station 102. In communication over downlinks 118 and 124, the transmitting antennas of base station 102 can utilize beamforming to improve signal-to-noise ratio of downlinks 118 and 124 for UEs 116 and 122. Also, while base station 102 utilizes beamforming to transmit to UEs 116 and 122 scattered randomly through an associated coverage, UEs in neighboring cells can be subject to less interference as compared to a base station transmitting through a single antenna to all its UEs. Moreover, UEs 116 and 122 can communicate directly with one another using a peer-to-peer or ad hoc technology (not shown).

According to an example, system 100 can be a multiple-input multiple-output (MIMO) communication system. Further, system 100 can utilize substantially any type of duplexing technique to divide communication channels (e.g., downlink, uplink, . . . ) such as FDD, FDM, TDD, TDM, CDM, and the like. In addition, communication channels can be orthogonalized to allow simultaneous communication with multiple devices or UEs over the channels; in one example, OFDM can be utilized in this regard. Thus, the channels can be divided into portions of frequency over a period of time. In addition, frames can be defined as the portions of frequency over a collection of time periods; thus, for example, a frame can comprise a number of OFDM symbols. The base station 102 can communicate to the UEs 116 and 122 over the channels, which can be created for various types of data. For example, channels can be created for communicating various types of general communication data, control data (e.g., quality information for other channels, acknowledgement indicators for data received over channels, interference information, reference signals, etc.), and/or the like.

In one example, base station 102 can be a macrocell base station. In addition, a small scale base station 128 is provided, which can be a femtocell, picocell, relay node, and/or the like. The small scale base station 128 can communicate with UEs using similar technology to that of base station 102. For example, the small scale base station 128 can define channels over radio communication as well and can transmit to one or more UEs, such as UE 130, over a downlink 132 while receiving over an uplink 134. A network operator (e.g., an entity that provides wireless communication services to users over a wireless communication network via base stations and/or mobile devices) can deploy one or more base stations (e.g., base station 102) to organize a wireless communication network capable of providing services to users. In addition, the network operator can deploy one or more femtocells (e.g., small scale base station 128) to supplement the wireless communication network. In another aspect, deployment of femtocells can be unplanned and carried out by a user. For instance, a user can acquire and install small scale base station 128 is a residence or an office.

Unplanned deployment of femtocells can disrupt macrocellular mechanisms (e.g., services associated with macrocell base station 102) and/or result in inefficient resource utilization on the part of mobile devices (e.g., UEs 116 and 122). In one example, unplanned deployment can result in frequent handover situations as a mobile device enters and exits a coverage area of a femtocell. Such frequent handovers can generate disruptions in communications (e.g., dropped calls). In another example, battery resources of a mobile device can be increasingly utilized during idle periods when the mobile device detects a strong signal from a femtocell and attempts to perform idle handoff and register with the femtocell. However, due to the limited coverage area of femtocells, the femtocell signal can fade quickly requiring the mobile device to consume additional power resources to detect, acquire and register with another cell.

According to an aspect, cell information can be provisioned to UEs 116 and 122 to facilitate identification of cells and discovery of cell characteristics of identified cells. In one instance, cell information can facilitate selection of cells and/or whether a cell is a candidate for handoff. In addition, cell information can be employed to disregard particular cells (e.g., femtocells with closed subscriber groups) in a region. The cell information can include frequencies and/or bands of frequencies employed by cells in one or more networks. In addition, the cell information can include pilot characteristics of individual cells. For instance, pseudo-random noise (PN) offsets of individual cells can be specified in the cell information. In another example, scrambling codes (e.g., primary scrambling codes and/or secondary scrambling codes) as well as physical cell identifiers (IDs) of cell in one or more networks can be included.

In another aspect, provisioning mechanisms of a wireless communication network can be utilized to transmit the cell information to UEs 116 and 122. In one example, over-the-air provisioning techniques (e.g., over-the-air service provisioning (OTASP), Internet-based over-the-air (IOTA) provisioning, Open Mobile Alliance (OMA) device management (DM), and/or short message service (SMS)) can be utilized by base station 102 and/or small scale base station 128 to provide the cell information to UEs 116 and/or 122. For instance, a preferred user zone list (PUZL) can be modified and/or extended to accommodate the cell information. The PUZL including the cell information can be downloaded to UEs 116 and/or 122 via over-the-air provisioning. It is to be appreciated that the cell information can be provisioned to UEs 116 and/or 122 via a variety of mechanisms. For instance, UEs 116 and/or 122 can be connected to a wired network or a wireless IP network to obtain the cell information. In another example, UEs 116 and 122 can be coupled to a machine that programs the cell information. In addition, the cell information can be provided on a memory module, a diskette, a CD, a DVD, a subscriber identity module (SIM), or other computer-readable storage medium. In yet another example, a user can manually enter cell information into UEs 116 and 122.

Figure 2:
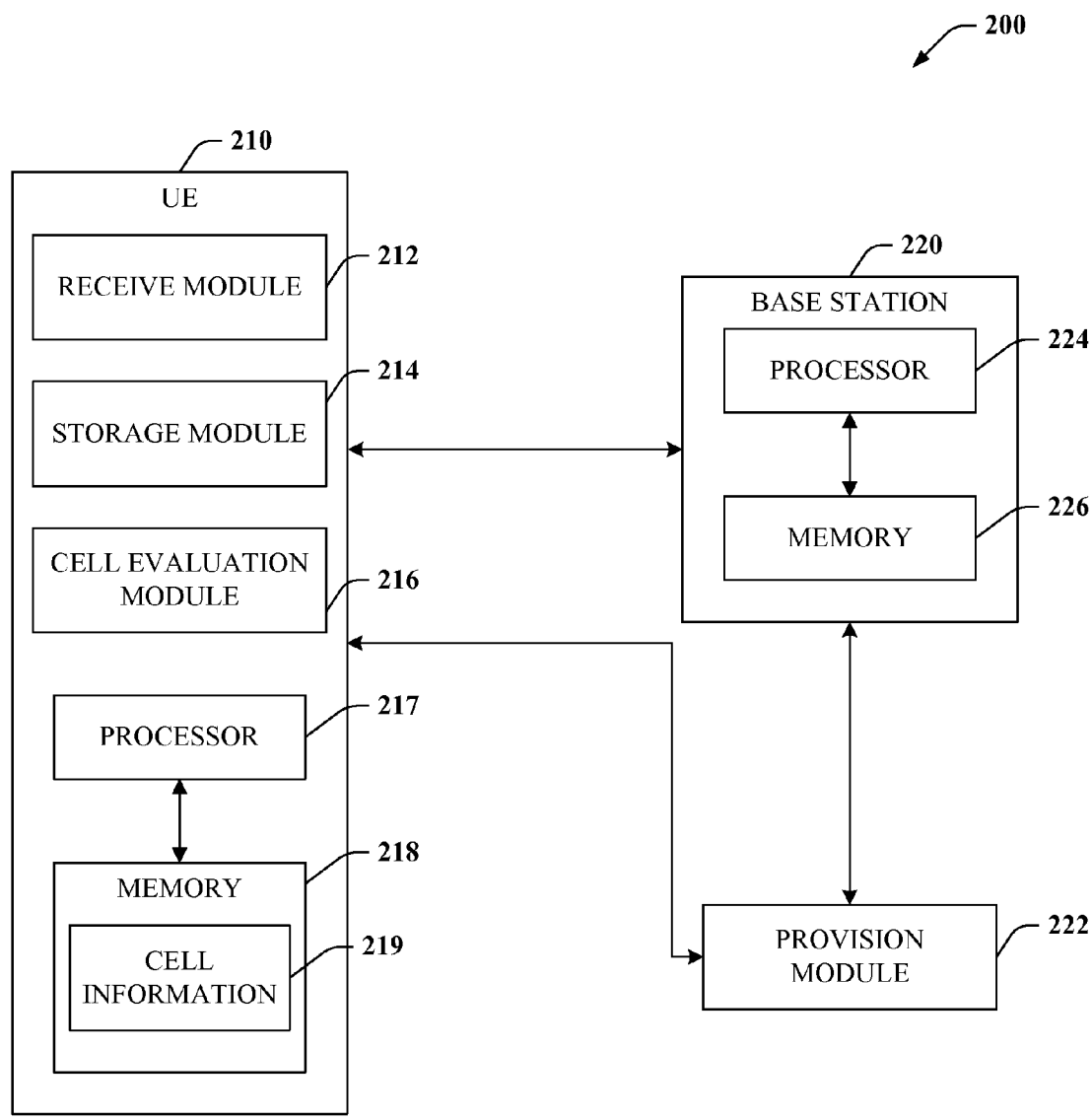
FIG. 2 illustrates an example system that facilitates dissemination of cell information to mobile devices in accordance with various aspects.

Turning to FIG. 2, illustrated is a wireless communication system 200 that facilitates dissemination of cell information to mobile devices in accordance with various aspects. As FIG. 2 illustrates, system 200 can include one or more user equipment units (UEs) 210, which can communicate with one or more base stations 220. While only one UE 210 and one base station 220 are illustrated in FIG. 2, it should be appreciated that system 200 can include any number of UEs 210 and/or base stations 220. In accordance with one aspect, base station 220 can transmit information to UE 210 over a forward link or downlink channel and UE 210 can transmit information to base station 220 over a reverse link or uplink channel. It should be appreciated that system 200 can operate in an OFDMA wireless network, a CDMA network, a 3GPP LTE or LTE-A wireless network, a 3GPP2 CDMA2000 network, etc.

UE 210 can include a receive module 212 that obtains cell information. In addition, UE 210 can include a storage module 214 that facilitates storing the cell information. The cell information can be stored on UE 210 or associated with UE 210, for example, as cell information 219 in a computer-readable storage medium such as memory 218, a smart card, a subscriber identity module (SIM) card, or the like.

In one aspect, the cell information can be downloaded to UE 210 from a provision module 222. The provision module 222 can be, for example, an application server within a wireless communication network. However, it should be appreciated that the provision module 222 can be incorporated into base station 220 to enable efficient and rapid provisioning to one or more mobile devices such as UE 210. In accordance with an aspect, the provision module 222 can employ over-the-air provisioning techniques to transmit cell information to UE 210. For instance, the provision module 222 can provide the cell information to base station 220 to transmit via a wireless communication channel to UE 210. For example, the provision module 222 can utilize over-the-air service provisioning (OTASP) to convey the deployment information. In another example, a preferred user zone list (PUZL) typically downloaded via OTASP can be modified and/or extended to accommodate the cell information. In accordance with this example, the receive module 212 of UE 210 can operate as an OTASP client to facilitate transmission of the cell information and/or a PUZL that incorporates the cell information. It is to be appreciated that other over-the-air provisioning techniques can be employed. For example, internet-based over-the-air (IOTA) provisioning, Open Mobile Alliance (OMA) device management (DM), short message service (SMS), or the like can be utilized by the provision module 222 to convey cell information to UE 210.

In accordance with another example, control channels and/or broadcast channels can be employed to convey the cell information. For instance, UE 210 can receive cell information via a control channel transmission upon detection and acquisition of service from base station 220. In another example, provision module 222 can utilize base station 220 to transmit cell information via a broadcast channel to UE 210 as well as other UEs (not shown) served by base station 220. In yet another aspect, it should be appreciated that base station 220 can transmit cell information to UE 210 via a downlink data channel assigned to UE 210. In addition, it is to be appreciated that the transmission of cell information can be automatic or upon request by UE 210.

In an aspect, cell information 219 can include various sets of information and/or associations between sets of information. In one example, the cell information 219 can include network/area information, deployment information and/or cell characteristics. Network/area information can specify information that identifies a wireless communication network and/or a geographical area. For instance, the network/area information in cell information 219 can include a system identification (SID) number, a network identification (NID) number, a mobile country code (MCC), a mobile network code (MNC), public land mobile network (PLMN) identifier, or a location area (e.g., a circular area around a latitude and longitude point). Deployment information included in cell information 219 can include pilot information and/or cell identification information. For example, the deployment information can include pseudorandom (PN) offsets, scrambling codes, and/or physical cell identifiers (PCIs). In addition, the deployment information can include frequencies (e.g., CDMA channel numbers, radio frequency channel number (RFCN), absolute radio frequency channel number (ARFCN), evolved ARFCN (EARFCN)) and/or bands of frequencies (e.g., band class) utilized by cells within the wireless communication network. In addition, the cell information 219 can include cell characteristics of one or more cells such as, but not limited to, coverage of a cell, transmit power of a cell, whether the cell is a femtocell, a picocell, or a macrocell, and/or whether the cell has an open or closed association. In accordance with another aspect, an operator of a wireless communication network can reserve particular frequencies, bands of frequencies, PN offsets, and/or synchronization codes for femtocells such that femtocells on the wireless communication network utilize frequencies, offsets, and/or codes within the reserved space. The cell information 219 can specify the reserved properties of particular network such that a femtocell can be identified whenever a pilot signal is detected having a reserved frequency, PN offset, and/or code.

To facilitate cell detection, selection, and/or discovery of cell characteristics, UE 210 can employ a cell evaluation module 216 to analyze received signals (e.g., pilot signals) in view of the cell information 219. In accordance with an example, the cell evaluation module 216 can identify characteristics of the received pilot signal such as, but not limited to, frequency of the pilot signal, PN offset of the pilot signal, synchronization/scrambling codes associated with the pilot signal, or the like. The cell evaluation module 216 can utilize the identified characteristics of the received pilot signal (e.g., identified deployment information) to query cell information 219 to determine cell characteristics of the cell as provided by a mapping of deployment information to cell characteristics included in the cell information 219.

As further illustrated in system 200, UE 210 can include a processor 217 and/or a memory 218, which can be utilized to implement some or all of the functionality of receive module 212, storage module 214, cell evaluation module 216 and/or any other component(s) of UE 210. In addition, memory 218 can be employed to retain cell information 219 which can correspond to information provisioned to UE 210. Similarly, FIG. 2 illustrates that base station 220 can include a processor 224 and/or memory 226 to implement some or all of the functionality of base station 220.

Figure 3:
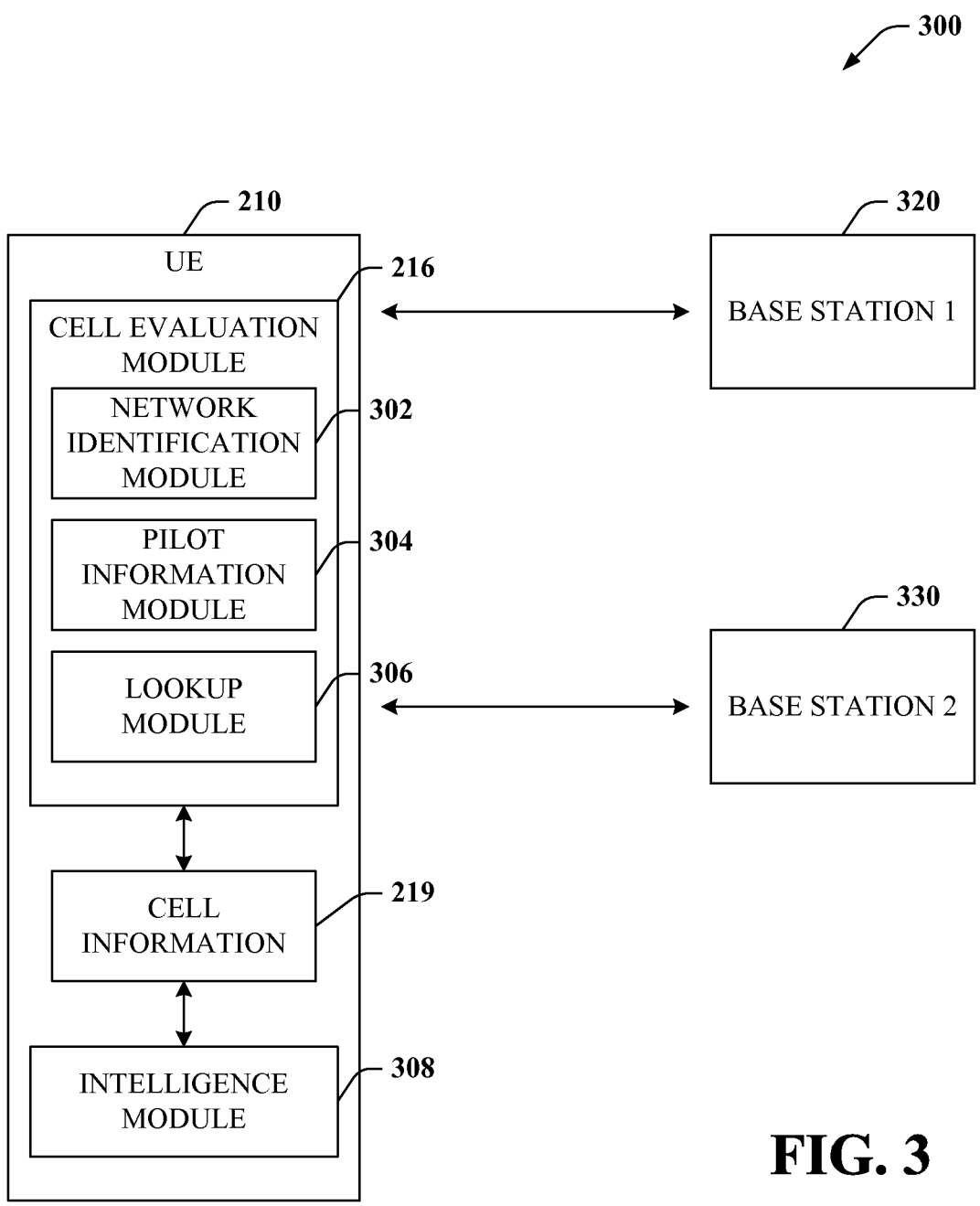
FIG. 3 is an illustration of an example system that facilitates detection and/or discovery of cell characteristics in a wireless communication network in accordance with one or more aspects.

Referring to FIG. 3, illustrated is a system 300 that facilitates detection and/or discovery of cell characteristics in a wireless communication network in accordance with one or more aspects. System 300 can include UE 210 that can be similar to and perform similar functionality as UE 210 described supra with respect to FIG. 2. In addition, system 300 can include base stations such base stations 320 and 330 which can be substantially similar to base station 102 or base station 220 previously described. Further, it can be appreciated that respective base stations in system 300 can serve any suitable coverage area, such as an area associated with a macrocell, a femtocell (e.g., an access point base station or Home Node B (HNB)), and/or any other suitable type of coverage area.

In accordance with an example, base stations 320 and 330 can transmit pilot signals to enable mobile devices to detect and synchronize with the wireless communication network. The pilot signals can also be utilized to facilitate identification of cells and discovery of cell characteristics of cells. UE 210 can include a cell evaluation module 216 that can utilize stored cell information 219 of cells in a wireless communication network to identify cells based upon received pilot signals.

In an aspect, cell information 219 can provide mappings or associations between at least three sets of information. For instance, deployment information of cells (e.g., frequencies, PN offsets, synchronization codes, scrambling codes, and/or band classes allocated to cells (e.g., femto and/or macro) in a region) can be categorized (e.g., mapped) based upon identities macrocells and/or areas (e.g., network/area information). In one example, a system identification number (SID) and/or a network identification number (NID) can be utilized to filter deployment information to determine pilot characteristics of cells deployed within an area covered by a base station associated with the SID and/or NID. It should be appreciated that other identity mechanisms can be utilized in addition to SID/NID. For instance, a physical layer cell identity and/or cell identity group in LTE-based networks can be utilized to categorize deployment information. Pursuant to another example, base station 330 can be a femtocell within a coverage area of a macrocell base station 320. Deployment information corresponding to femtocell base station 330 can be mapped to an identity (e.g., cell identify, SID/NID, etc.) of macrocell base station 320. In another aspect, deployment information and/or network/area information can be mapped to cell characteristics of individual cells. Accordingly, a network or area can be identified and utilized to filter the cell information 219 to include only deployment information and/or cell characteristics associated with the identified network or area. Specific deployment information of a cell can be gathered through analysis of a pilot signal or other suitable signal from the cell. The specific deployment information can be utilized to obtain cell characteristics of a particular cell from the cell information 219.

The cell evaluation module 216 can include a network identification module 302 that determines an identity of a cell based upon received signals. The cell can be a macrocell that can include one or more femtocell deployments. For instance, the network identification module 302 can determine an identity of base station 320 and/or 330 based upon respective signals transmitted by base stations 320 and 330 and received by UE 210. The network identification module 302 can analyze a synchronization message to determine a SID and a NID associated with base station 320 and/or 330. In another example, the network identification module 302 can analyze primary synchronization codes (PSC) and secondary synchronization codes (SSC) to determine a cell identity and/or a cell identity group associated with base station 320 or 330.

In accordance with another aspect, the cell evaluation module 216 can include a pilot information module 304 that evaluates signals from a base station (e.g., base station 320 and/or 330) to identify deployment information such as pilot characteristics (e.g., PN offsets, scrambling codes, etc.), frequency bands, channel numbers, or the like. The cell evaluation module 216 can further include a lookup module 306 that utilizes identified deployment information, network identities, and/or cell identities to query cell information 219 to determine cell characteristics associated with the base station. In one example, lookup module 306 can filter cell information 219 based upon a network identity or cell identity associated with a macrocell base station as determined by the network identification module 302. The lookup module 306 can further filter the cell information 219 based upon deployment information determined by the pilot information module 304 to determine cell characteristics of the base station. In an example, UE 210 can employ the cell characteristics to determine if a base station is a femtocell. In such cases, UE 210 can acquire service from the femtocell and/or disregard the femtocell despite receiving a strong pilot. In other situations, UE 210 can analyze the cell characteristics of a discovered base station and determine that a handoff should be initiated.

In another example, the network identification module 302 and lookup module 306 can be employed to determine if a femtocell search should be initiated. In an example, the network identification module 302 can determine a network identity or cell identity associated with a macrocell base station (e.g., base station 320). The network or cell identity can be utilized by the lookup module 306 to query deployment information 219 to determine if femtocell deployments are located within a coverage area provided by the macrocell base station (base station 320). For instance, base station 330 can be a femtocell within the coverage area of macrocell base station 320. The UE 210 can identify deployment information corresponding to the femtocell base station 330 (e.g., frequency band, PN offset, synchronization codes, etc.) and utilize the deployment information to detect, acquire, and register with base station 330. In yet another example, a process similar to the femtocell search can be utilized to discover if a handoff should be initiated. For instance, network identity or area information can be utilized to obtain deployment information and/or cell characteristics specified in cell information 219 for a particular network and/or area. The cell characteristics can be evaluated to discover a base station capable of offering improved service to which UE 210 can handoff to.

In an aspect, UE 210 can employ an intelligence module 308 to supplement cell information 219. During cell search or cell acquisition procedures, UE 210 can detect pilots associated with cells (e.g., macrocells, femtocells, etc.). For example, UE 210 can detect base station 330. The intelligence module 308 can add cell characteristics and/or deployment information associated with base station 330 to cell information 219 when such information is absent. Moreover, the intelligence module 308 can generate a mapping between a network identity of a network associated with base station 330 and/or area information associated with base station 330 and the deployment information/cell characteristics of base station 330.

Figure 4:
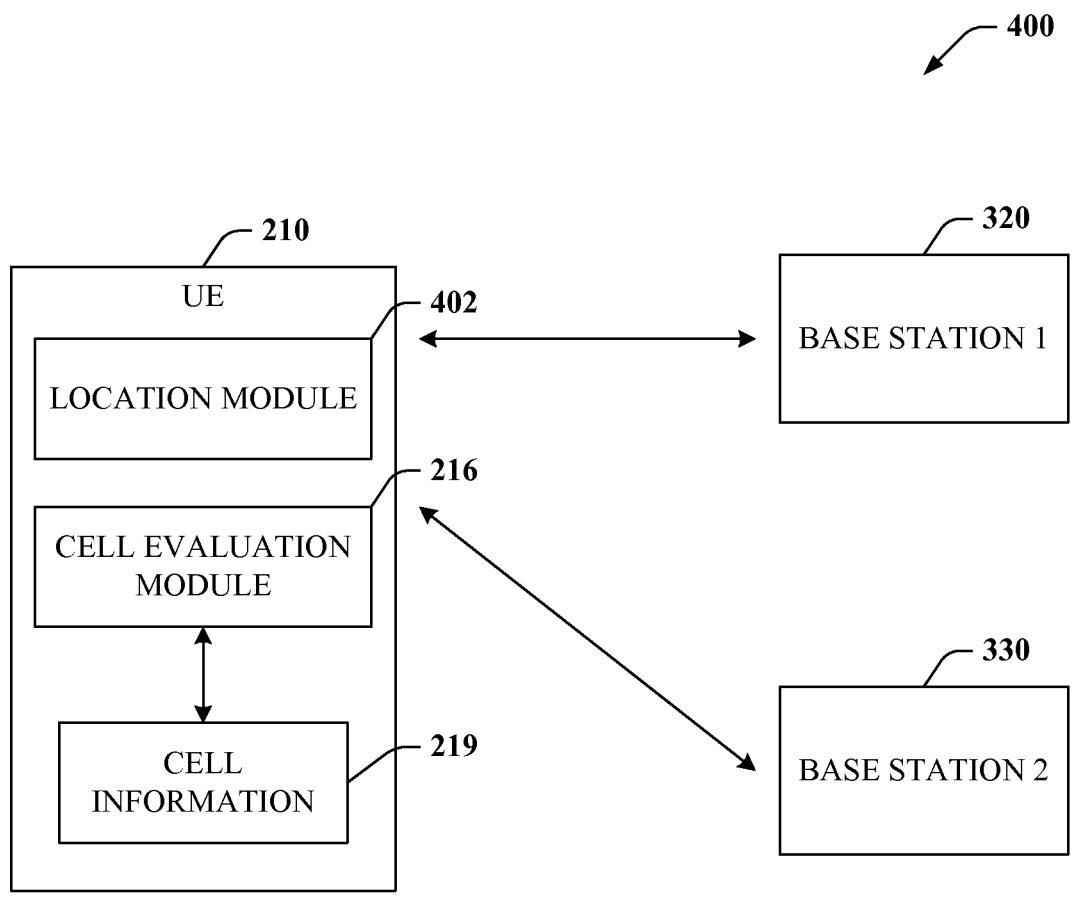
FIG. 4 is an illustration of an example wireless communication system that facilitates identification of cell characteristics based upon location information in accordance with various aspects.

Referring now to FIG. 4, illustrated is a system 400 that facilitates identification of cell characteristics based upon location information in accordance with various aspects. System 400 includes UE 210 that retains cell information 219 related to one or more within a wireless communication network. In one aspect, cell information 219 can be categorized based upon location (e.g., geographical location) information. For example, a subset of deployment information and/or a subset of cell characteristic information included in cell information 219 can be mapped to a particular location or area.

In one example, cell information 219 can be categorized based upon location (e.g., geographical location) of femtocells. For instance, operators of wireless communication networks can allocate frequency bands, PN offsets, scrambling codes, and synchronization codes for femtocell deployments in different manners based upon geographical location. For example, different sets PN offsets or frequency bands can be allocated to femtocells in the eastern half of the United States than allocated to femtocells in the western half of the United States. It is should be appreciated that such allocations are exemplary and that different geographical delineations of varying granularity can be employed. For instance, femtocell deployment information can be categorized at a state level, a city level, a county level, etc. It is to be appreciated that femtocell deployments are a example of information included in cell information 219 and that additional cell deployments (e.g., macrocells) can be further included.

UE 210 can include a location module 402 that determines location information associated with UE 210. The location module 402 can utilize global positioning system (GPS), triangulation, or other suitable locating mechanisms to determine the location information. The location information can identify a location of UE 210 to utilize to query cell information 219 to discover cell characteristics and/or deployment information associated with cells. For example, the location information can be utilized by the cell evaluation module 216 to determine cell deployments located in proximity to UE 210 as well as characteristics of such cell deployments (e.g., pilot characteristics, cell characteristics, etc.).

Figure 5:
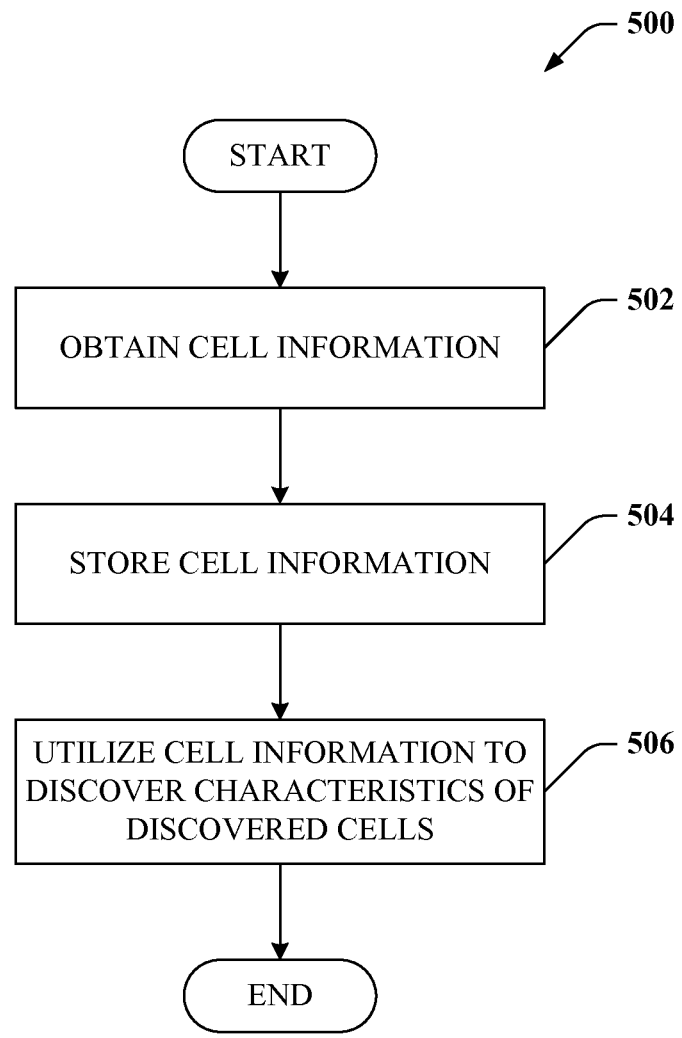
FIG. 5 is an illustration of an example methodology for discovering cell characteristics based upon cell information provisioned to a mobile device in accordance with various aspects.
Figure 6:
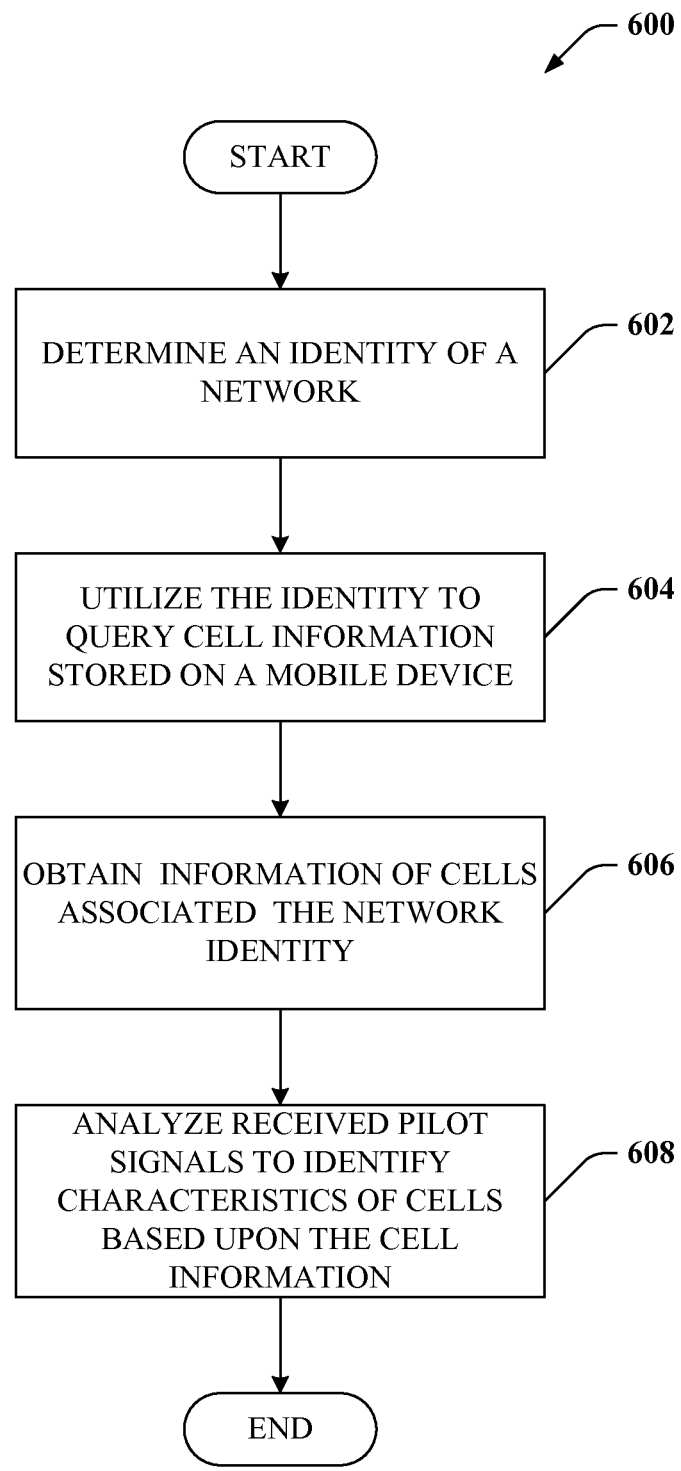
FIG. 6 is an illustration of an example methodology for identifying characteristics of a cell based upon cell information in accordance with various aspects.
Figure 7:
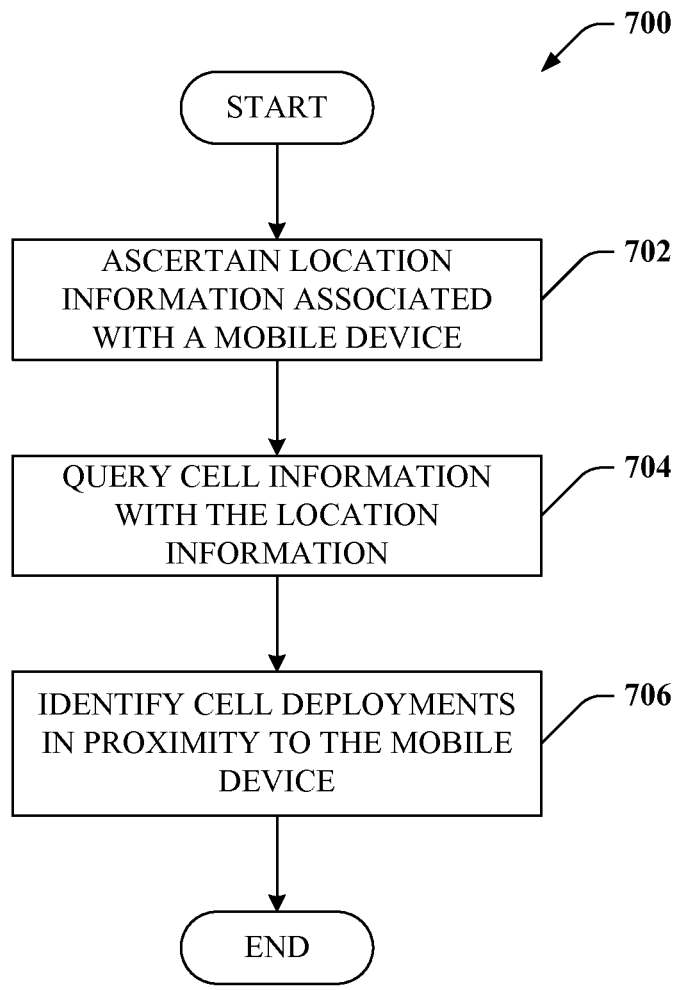
FIG. 7 is an illustration of an example methodology for selecting a cell and/or initiating handoff behavior to a cell based upon cell information in accordance with various aspects.

Referring to FIGS. 5-7, methodologies relating to utilizing cell information (e.g., network/area information, deployment information, and/or cell characteristics) provisioned to a mobile device to facilitate cell selection and/or handovers are described. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 5, illustrated is a method 500 for discovering cell characteristics of detected cells based upon cell information provisioned to a mobile device in accordance with various aspects. At reference numeral 502, cell information is obtained via a provisioning technique. For instance, over-the-air provisioning techniques such as OTASP, IOTA, OMA DM, and/or SMS can be employed to obtain cell information. It is to be appreciated that other provisioning techniques can be utilized. For example, an IP connection can be established between a mobile device and an application server to enable download of cell information. In other example, the cell information can be provisioned on a computer-readable storage medium. At reference numeral 504, the cell information is stored in a computer-readable storage medium associated with a mobile device. At reference numeral 506, the cell information is utilized to facilitate discovery of cell characteristics associated with detected cells.

Referring to FIG. 6, illustrated is a method 600 for identifying characteristics of a cell based upon cell information in accordance with various aspects. At reference numeral 602, an identity of a network is determined. The network can be a wireless communication network that includes a base station serving a mobile device. The network identity can be a system identification (SID) number and/or a network identification (NID) number obtained from a synchronization message transmitted by the base station serving the mobile device. In another example, the identity can be a cell identity and/or a cell identity group determined via a primary synchronization signal and a secondary synchronization signal. At reference numeral 604, the identity is utilized to query cell information provisioned to and stored on a mobile device. The cell information can include network/area information, deployment information, cell characteristic information, as well as, provide mappings therebetween.

At reference numeral 606, deployment information and/or cell characteristic information associated with the network identity is obtained. The deployment information and/or cell characteristic information can be obtained as a result of the query on the provisioned cell information. In one example, the provisioned cell information can be categorized based upon network identity such that deployment information corresponding to particular cells with a network is associated with an identity of the network. At reference numeral 608, received pilots signals can be analyzed and correlated with the deployment information and/or cell characteristic information to identify characteristics of cells.

FIG. 7 illustrates a method 700 for selecting a cell and/or initiating handoff behavior to a cell based upon cell information in accordance with various aspects. At reference numeral 702, location information associated with a mobile device is ascertained. The location information can be obtained via GPS mechanisms, triangulation among three or more base stations, base station identity information, or the like. At reference numeral 704, the location information can be employed to query cell information deployed to a mobile device via a provisioning mechanism. In an aspect, the cell information can be categorized based upon location (e.g., geographical regions or areas) such that a location can be employed to determine deployment information and/or cell characteristics associated with cells within a region encompassing a particular location. At reference numeral 706, cells in proximity to the mobile device as determined by the location information can be identified.

It will be appreciated that, in accordance with one or more aspects described herein, inferences can be made regarding detecting pilot signals, querying cells information, identifying cells as one of femtocells or macrocells, and the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 8:
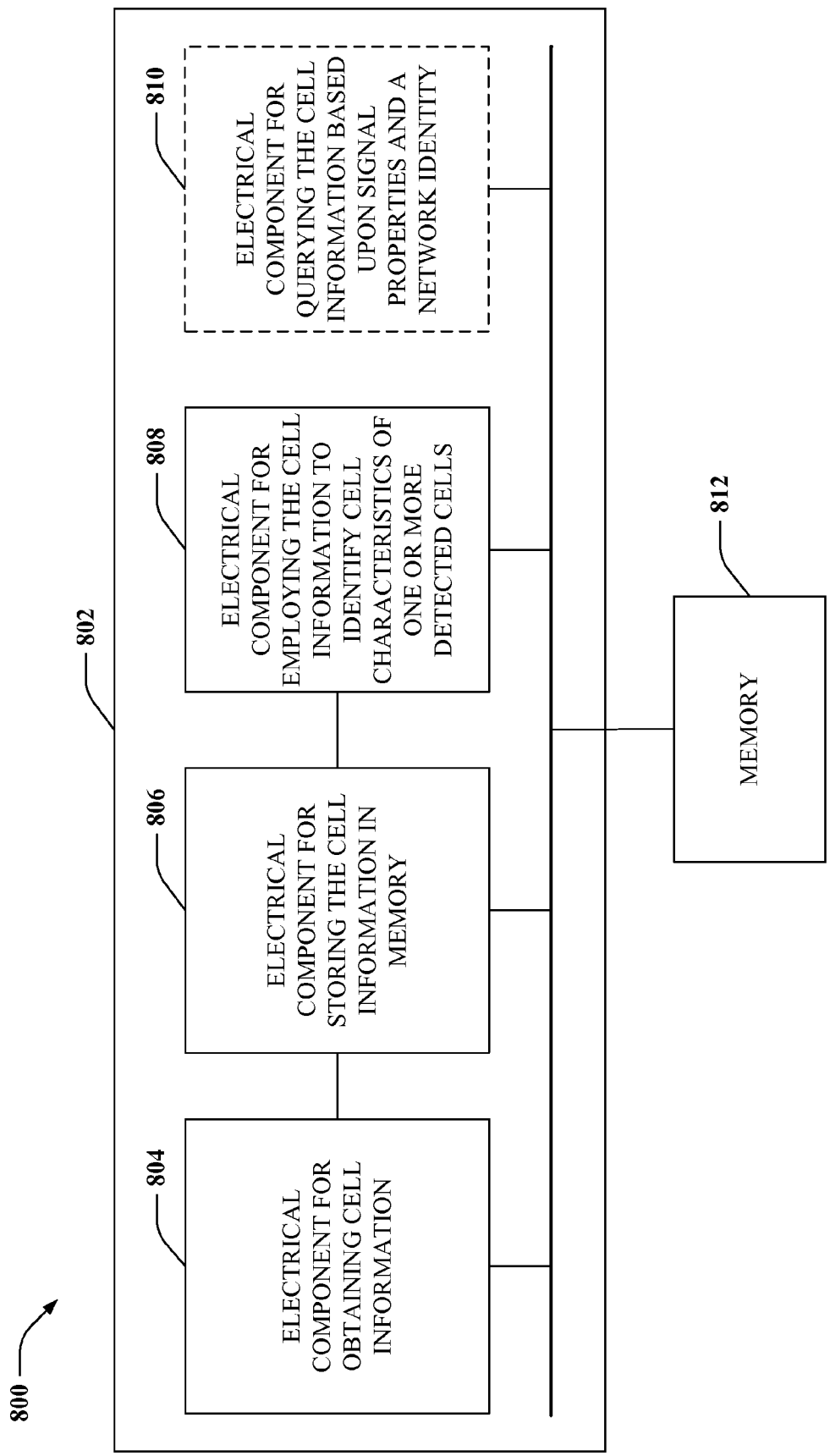
FIG. 8 is an illustration of an example system that enables cell characteristic discovery in accordance with an aspect.

With reference to FIG. 8, illustrated is a system 800 that enables cell characteristic discovery in accordance with an aspect For example, system 800 can reside at least partially within a user equipment unit. It is to be appreciated that system 800 is represented as including functional blocks, which can be functional blocks that represent functions implemented by a processor, software, or combination thereof (e.g., firmware). System 800 includes a logical grouping 802 of electrical components that can act in conjunction. For instance, logical grouping 802 can include an electrical component for obtaining cell information 804. Further, logical grouping 802 can comprise an electrical component for storing the cell information in memory 806. Moreover, logical grouping 802 can comprise an electrical component for employing the cell information to identify cell characteristics of one or more detected cells 808. Logical grouping 802 can also include an electrical component for querying the cell information based upon signal properties and a network identity 810. Additionally, system 800 can include a memory 812 that retains instructions for executing functions associated with electrical components 804, 806, 808 and 810. While shown as being external to memory 812, it is to be understood that one or more of electrical components 804, 806, 808 and 810 can exist within memory 812.

Figure 9:
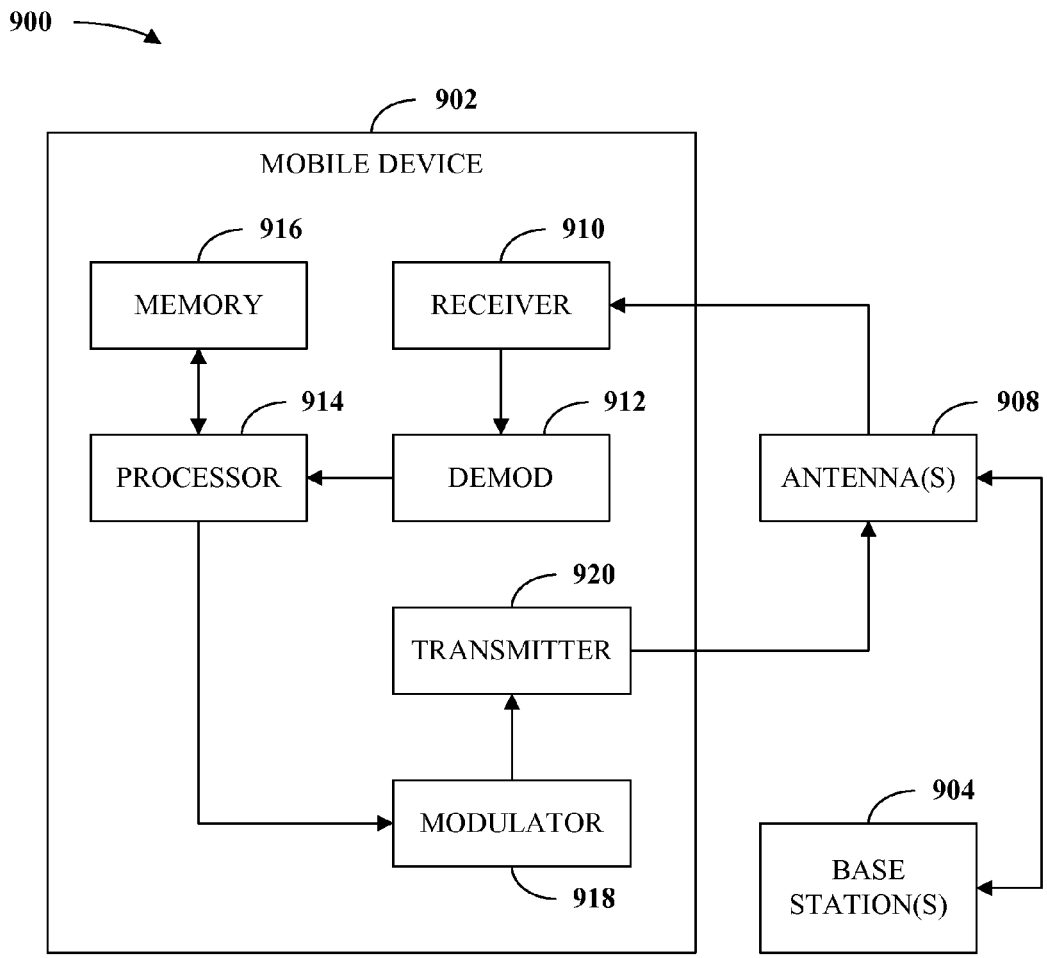
FIGS. 9-10 are block diagrams of respective wireless communication devices that can be utilized to implement various aspects of the functionality described herein.

FIG. 9 is a block diagram of another system 900 that can be utilized to implement various aspects of the functionality described herein. In one example, system 900 includes a mobile device 902. As illustrated, mobile device 902 can receive signal(s) from one or more base stations 904 and transmit to the one or more base stations 904 via one or more antennas 908. Additionally, mobile device 902 can comprise a receiver 910 that receives information from antenna(s) 908. In one example, receiver 910 can be operatively associated with a demodulator (Demod) 912 that demodulates received information. Demodulated symbols can then be analyzed by a processor 914. Processor 914 can be coupled to memory 916, which can store data and/or program codes related to mobile device 902. Mobile device 902 can also include a modulator 918 that can multiplex a signal for transmission by a transmitter 920 through antenna(s) 908.

Figure 10:
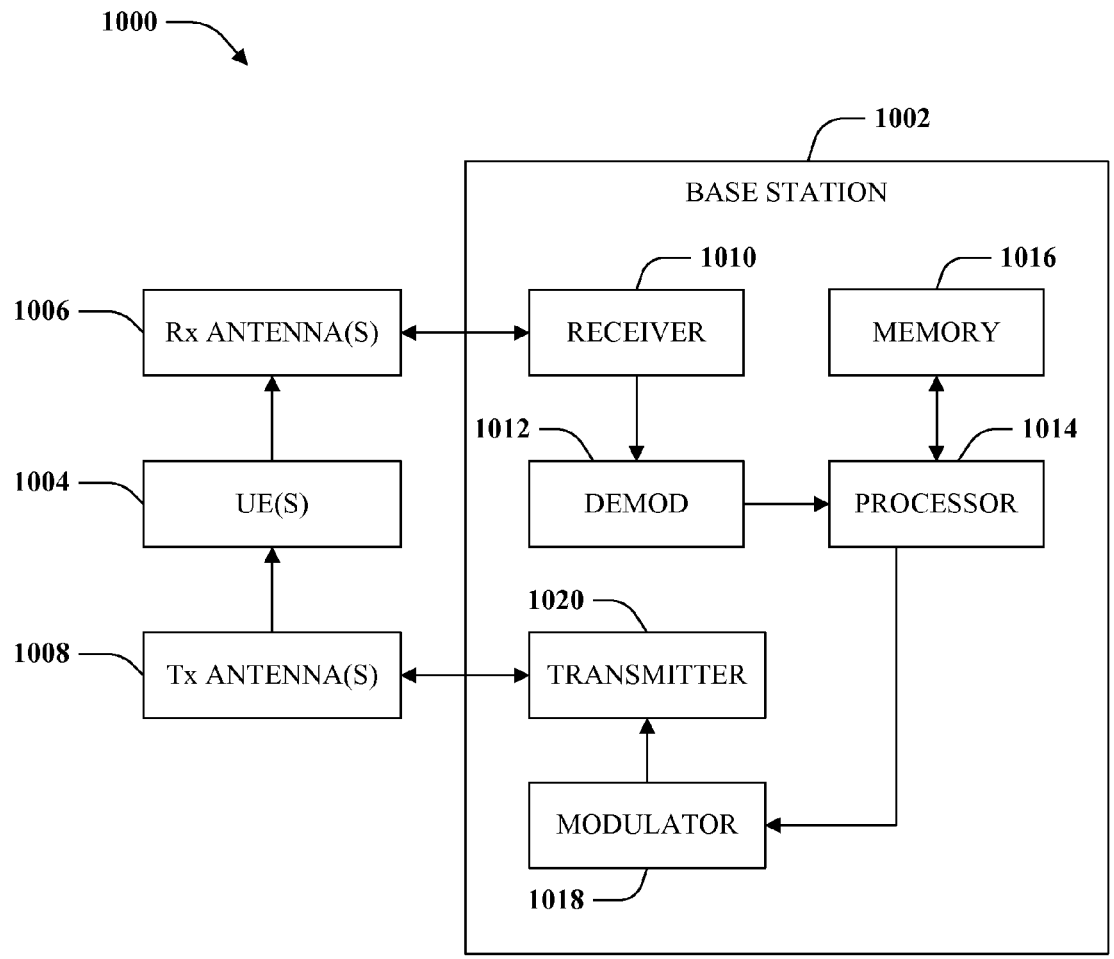

FIG. 10 is a block diagram of a system 1000 that can be utilized to implement various aspects of the functionality described herein. In one example, system 1000 includes a base station or base station 1002. As illustrated, base station 1002 can receive signal(s) from one or more UEs 1004 via one or more receive (Rx) antennas 1006 and transmit to the one or more UEs 1004 via one or more transmit (Tx) antennas 1008. Additionally, base station 1002 can comprise a receiver 1010 that receives information from receive antenna(s) 1006. In one example, the receiver 1010 can be operatively associated with a demodulator (Demod) 1012 that demodulates received information. Demodulated symbols can then be analyzed by a processor 1014. Processor 1014 can be coupled to memory 1016, which can store information related to code clusters, access terminal assignments, lookup tables related thereto, unique scrambling sequences, and/or other suitable types of information. In one example, base station 1002 can employ processor 1014 to perform method 700, and/or other similar and appropriate methodologies. Base station 1002 can also include a modulator 1018 that can multiplex a signal for transmission by a transmitter 1020 through transmit antenna(s) 1008.

In some aspects the teachings herein may be employed in a network that includes macro scale coverage (e.g., a large area cellular network such as a 3G networks, typically referred to as a macro cell network) and smaller scale coverage (e.g., a residence-based or building-based network environment). As an access terminal ("AT") moves through such a network, the access terminal may be served in certain locations by access nodes ("ANs") that provide macro coverage while the access terminal may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each cell may be further associated with (e.g., divided into) one or more sectors.

In various applications, other terminology may be used to reference a macro node, a femto node, or a pico node. For example, a macro node may be configured or referred to as an access node, base station, access point, eNodeB, macro cell, and so on. Also, a femto node may be configured or referred to as a Home NodeB, Home eNodeB, access point base station, femto cell, and so on.

Figure 11:
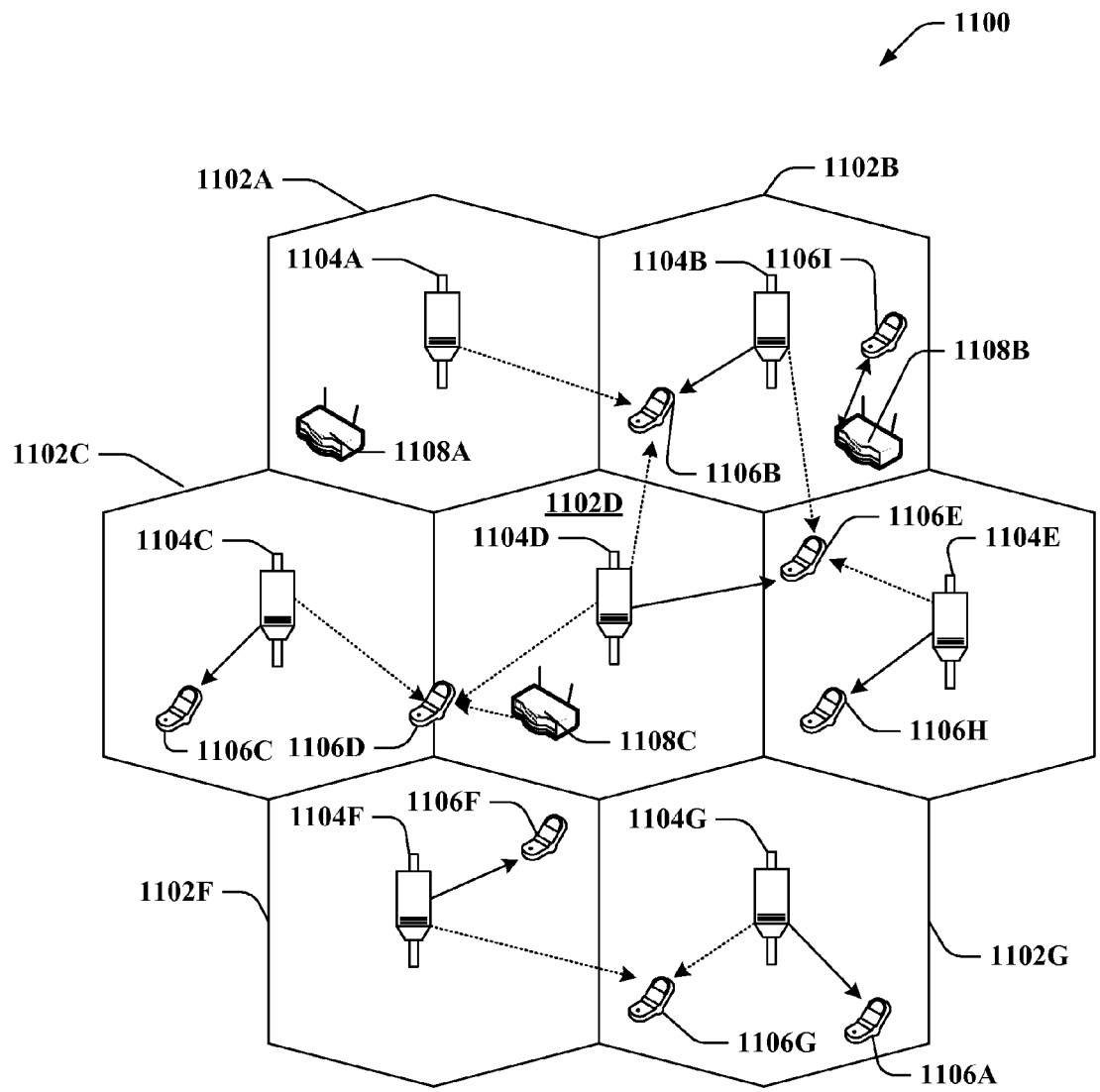
FIG. 11 illustrates an example wireless communication system in accordance with various aspects.

FIG. 11 illustrates a wireless communication system 1100, configured to support a number of users, in which the teachings herein may be implemented. The system 1100 provides communication for multiple cells 1102, such as, for example, macro cells 1102A-1102G, with each cell being serviced by a corresponding access node 1104 (e.g., access nodes 1104A-1104G). As shown in FIG. 11, access terminals 1106 (e.g., access terminals 1106A-1106L) may be dispersed at various locations throughout the system over time. Each access terminal 1106 may communicate with one or more access nodes 1104 on a forward link ("FL") and/or a reverse link ("RL") at a given moment, depending upon whether the access terminal 1106 is active and whether it is in soft handoff, for example. The wireless communication system 1100 may provide service over a large geographic region. For example, macro cells 1102A-1102G may cover a few blocks in a neighborhood.

Figure 12:
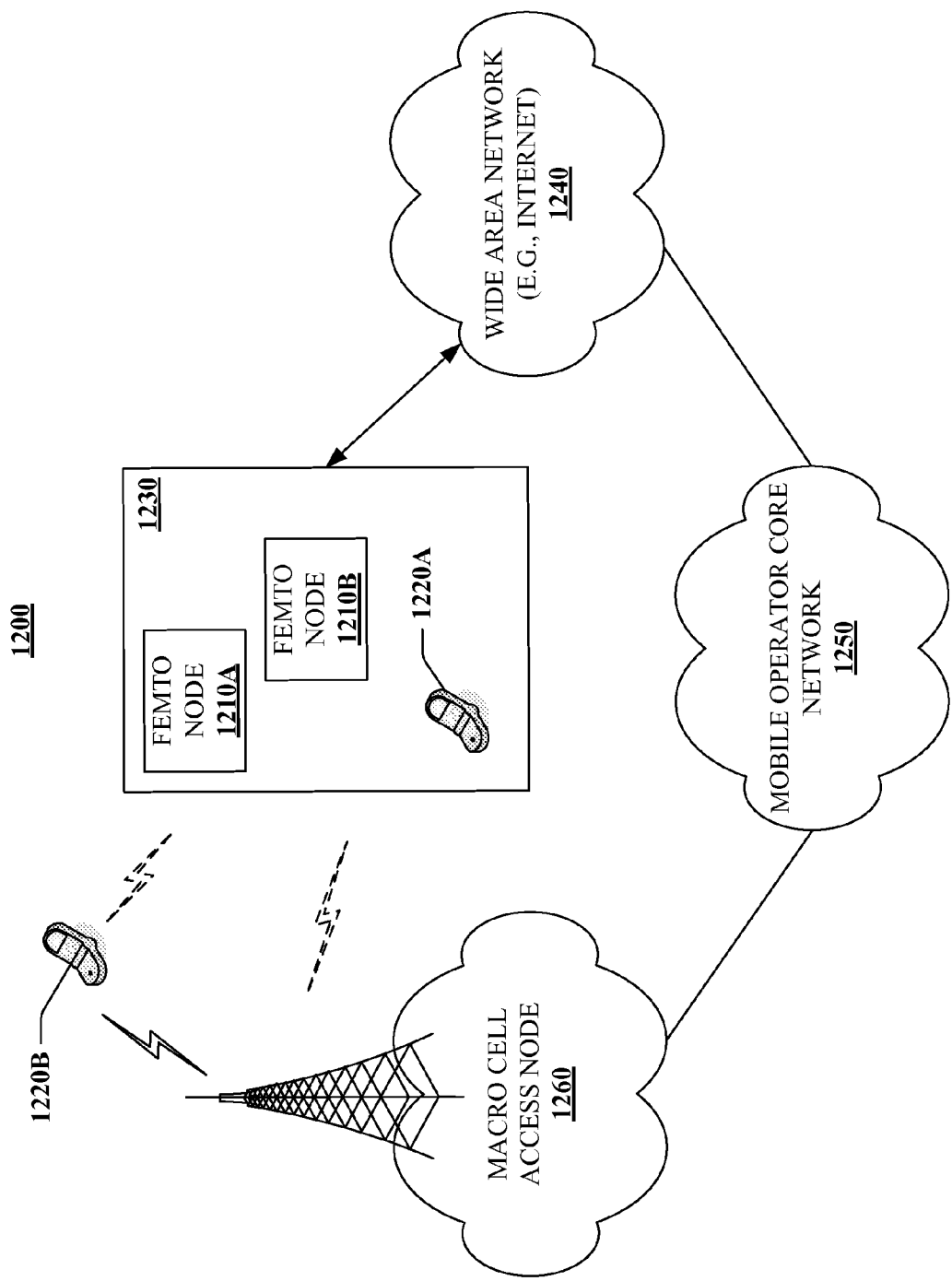
FIG. 12 illustrates an example system to enable deployment of access point base stations within a wireless network environment.

FIG. 12 illustrates an exemplary communication system 1200 where one or more femto nodes are deployed within a network environment. Specifically, the system 1200 includes multiple femto nodes 1210 (e.g., femto nodes 1210A and 1210B) installed in a relatively small scale network environment (e.g., in one or more user residences 1230). Each femto node 1210 may be coupled to a wide area network 1240 (e.g., the Internet) and a mobile operator core network 1250 via a DSL router, a cable modem, a wireless link, or other connectivity means (not shown). As will be discussed below, each femto node 1210 may be configured to serve associated access terminals 1220 (e.g., access terminal 1220A) and, optionally, alien access terminals 1220 (e.g., access terminal 1220B). In other words, access to femto nodes 1210 may be restricted whereby a given access terminal 1220 may be served by a set of designated (e.g., home) femto node(s) 1210 but may not be served by any non-designated femto nodes 1210 (e.g., a neighbor's femto node 1210).

Figure 13:
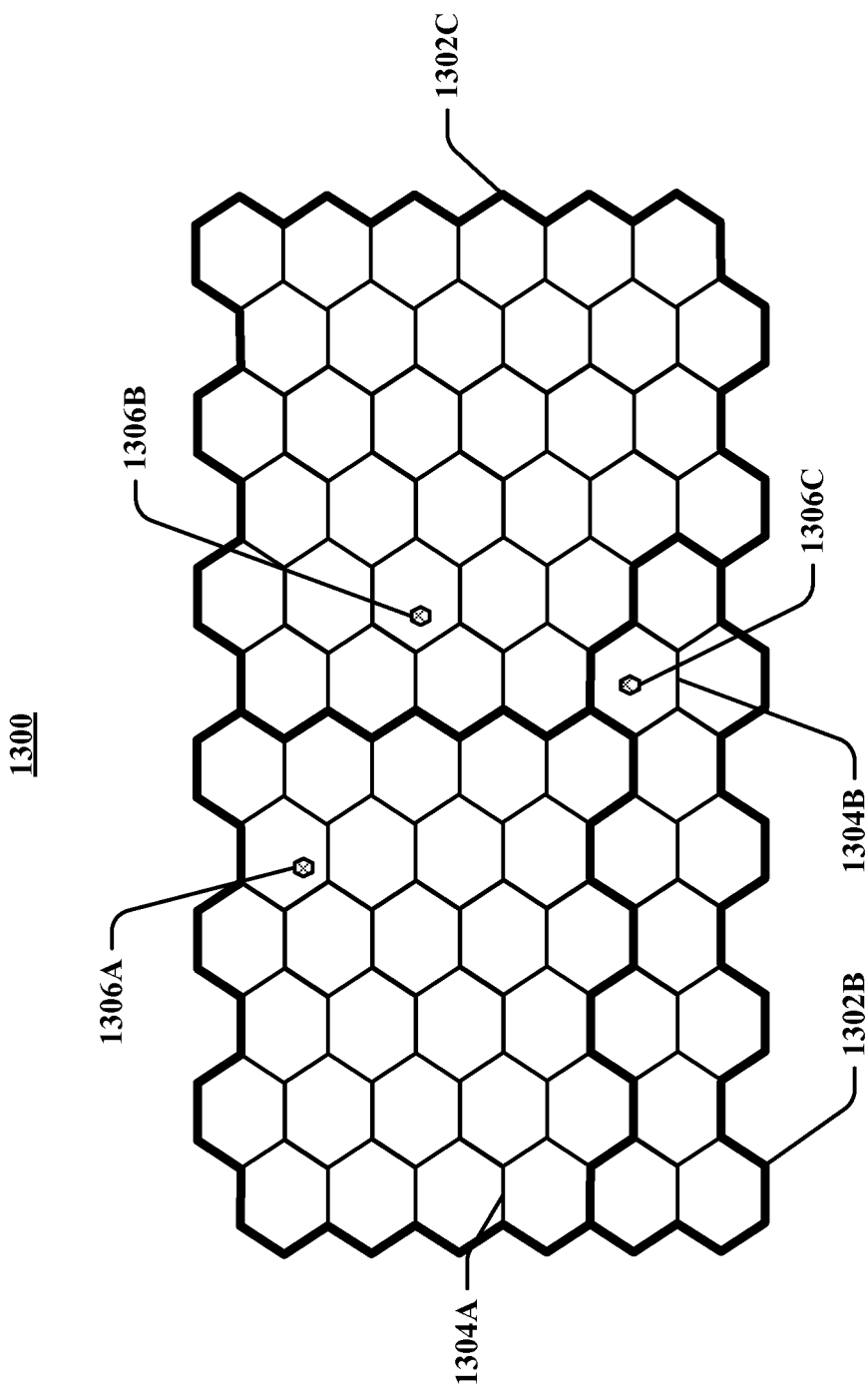
FIG. 13 illustrates an example coverage map that includes tracking areas.

FIG. 13 illustrates an example of a coverage map 1300 where several tracking areas 1302 (or routing areas or location areas) are defined, each of which includes several macro coverage areas 1304. Here, areas of coverage associated with tracking areas 1302A, 1302B, and 1302C are delineated by the wide lines and the macro coverage areas 1304 are represented by the hexagons. The tracking areas 1302 also include femto coverage areas 1306. In this example, each of the femto coverage areas 1306 (e.g., femto coverage area 1306C) is depicted within a macro coverage area 1304 (e.g., macro coverage area 1304B). It should be appreciated, however, that a femto coverage area 1306 may not lie entirely within a macro coverage area 1304. In practice, a large number of femto coverage areas 1306 may be defined with a given tracking area 1302 or macro coverage area 1304. Also, one or more pico coverage areas (not shown) may be defined within a given tracking area 1302 or macro coverage area 1304.

Referring again to FIG. 12, the owner of a femto node 1210 may subscribe to mobile service, such as, for example, 3G mobile service, offered through the mobile operator core network 1250. In addition, an access terminal 1220 may be capable of operating both in macro environments and in smaller scale (e.g., residential) network environments. In other words, depending on the current location of the access terminal 1220, the access terminal 1220 may be served by an access node 1260 of the macro cell mobile network 1250 or by any one of a set of femto nodes 1210 (e.g., the femto nodes 1210A and 1210B that reside within a corresponding user residence 1230). For example, when a subscriber is outside his home, he is served by a standard macro access node (e.g., node 1260) and when the subscriber is at home, he is served by a femto node (e.g., node 1210A). Here, it should be appreciated that a femto node 1210 may be backward compatible with existing access terminals 1220.

A femto node 1210 may be deployed on a single frequency or, in the alternative, on multiple frequencies. Depending on the particular configuration, the single frequency or one or more of the multiple frequencies may overlap with one or more frequencies used by a macro node (e.g., node 1260).

In some aspects, an access terminal 1220 may be configured to connect to a preferred femto node (e.g., the home femto node of the access terminal 1220) whenever such connectivity is possible. For example, whenever the access terminal 1220 is within the user's residence 1230, it may be desired that the access terminal 1220 communicate only with the home femto node 1210.

In some aspects, if the access terminal 1220 operates within the macro cellular network 1250 but is not residing on its most preferred network (e.g., as defined in a preferred roaming list), the access terminal 1220 may continue to search for the most preferred network (e.g., the preferred femto node 1210) using a Better System Reselection ("BSR"), which may involve a periodic scanning of available systems to determine whether better systems are currently available, and subsequent efforts to associate with such preferred systems. With the acquisition entry, the access terminal 1220 may limit the search for specific band and channel. For example, the search for the most preferred system may be repeated periodically. Upon discovery of a preferred femto node 1210, the access terminal 1220 selects the femto node 1210 for camping within its coverage area.

A femto node may be restricted in some aspects. For example, a given femto node may only provide certain services to certain access terminals. In deployments with so-called restricted (or closed) association, a given access terminal may only be served by the macro cell mobile network and a defined set of femto nodes (e.g., the femto nodes 1210 that reside within the corresponding user residence 1230). In some implementations, a node may be restricted to not provide, for at least one node, at least one of: signaling, data access, registration, paging, or service.

In some aspects, a restricted femto node (which may also be referred to as a Closed Subscriber Group Home NodeB) is one that provides service to a restricted provisioned set of access terminals. This set may be temporarily or permanently extended as necessary. In some aspects, a Closed Subscriber Group ("CSG") may be defined as the set of access nodes (e.g., femto nodes) that share a common access control list of access terminals. A channel on which all femto nodes (or all restricted femto nodes) in a region operate may be referred to as a femto channel.

Various relationships may thus exist between a given femto node and a given access terminal. For example, from the perspective of an access terminal, an open femto node may refer to a femto node with no restricted association. A restricted femto node may refer to a femto node that is restricted in some manner (e.g., restricted for association and/or registration). A home femto node may refer to a femto node on which the access terminal is authorized to access and operate on. A guest femto node may refer to a femto node on which an access terminal is temporarily authorized to access or operate on. An alien femto node may refer to a femto node on which the access terminal is not authorized to access or operate on, except for perhaps emergency situations (e.g., 911 calls).

From a restricted femto node perspective, a home access terminal may refer to an access terminal that authorized to access the restricted femto node. A guest access terminal may refer to an access terminal with temporary access to the restricted femto node. An alien access terminal may refer to an access terminal that does not have permission to access the restricted femto node, except for perhaps emergency situations, for example, such as 911 calls (e.g., an access terminal that does not have the credentials or permission to register with the restricted femto node).

For convenience, the disclosure herein describes various functionality in the context of a femto node. It should be appreciated, however, that a pico node may provide the same or similar functionality for a larger coverage area. For example, a pico node may be restricted, a home pico node may be defined for a given access terminal, and so on.

A wireless multiple-access communication system may simultaneously support communication for multiple wireless access terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out system, a multiple-in-multiple-out ("MIMO") system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 14:
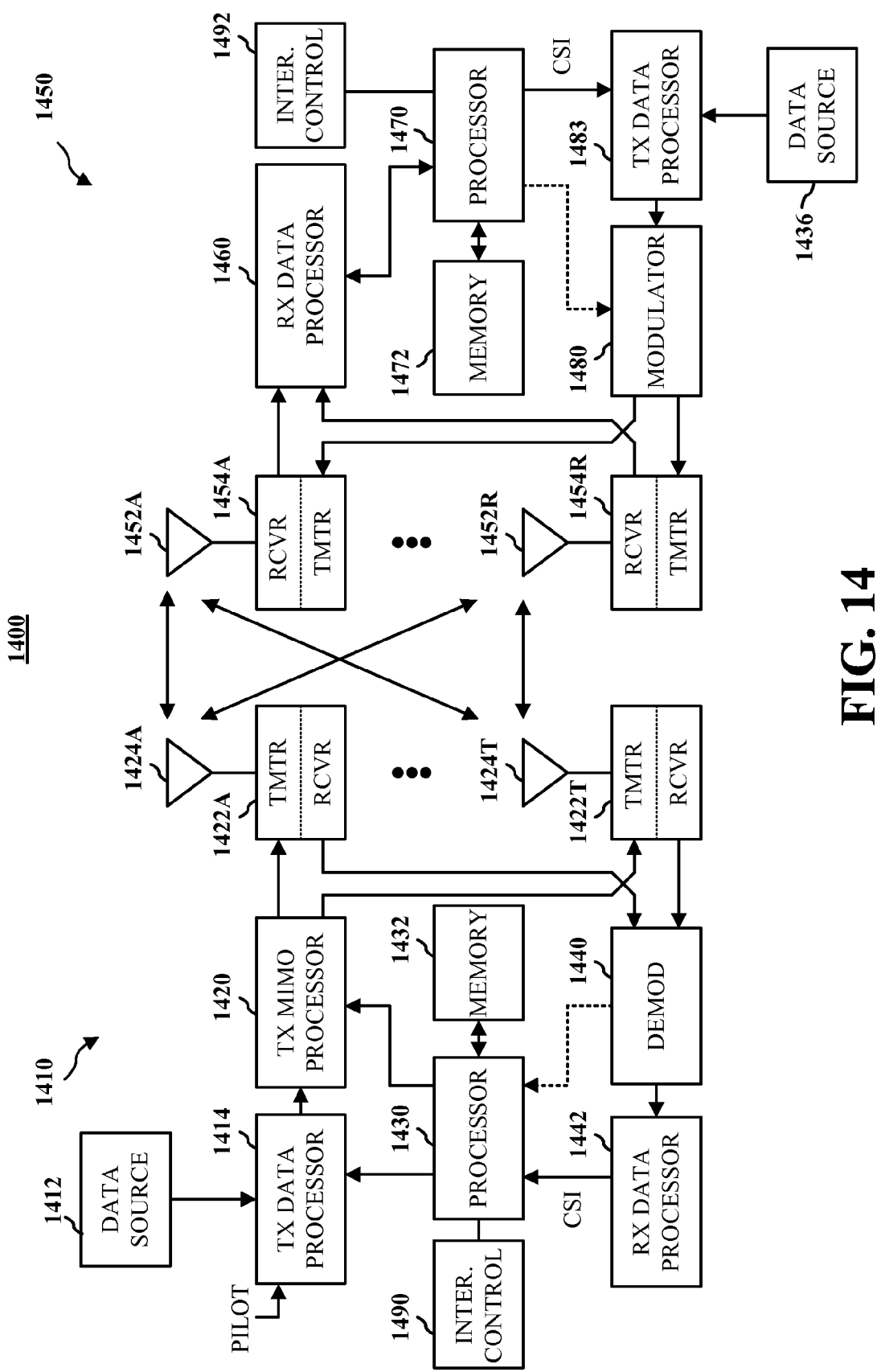
FIG. 14 is a block diagram illustrating an example wireless communication system in which various aspects described herein can function.

The teachings herein may be incorporated into a node (e.g., a device) employing various components for communicating with at least one other node. FIG. 14 depicts several sample components that may be employed to facilitate communication between nodes. Specifically, FIG. 14 illustrates a wireless device 1410 (e.g., an access point) and a wireless device 1450 (e.g., an access terminal) of a MIMO system 1400. At the device 1410, traffic data for a number of data streams is provided from a data source 1412 to a transmit ("TX") data processor 1414.

In some aspects, each data stream is transmitted over a respective transmit antenna. The TX data processor 1414 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1430. A data memory 1432 may store program code, data, and other information used by the processor 1430 or other components of the device 1410.

The modulation symbols for all data streams are then provided to a TX MIMO processor 1420, which may further process the modulation symbols (e.g., for OFDM). The TX MIMO processor 1420 then provides $N_T$ modulation symbol streams to $N_T$ transceivers ("XCVR") 1422A through 1422T. In some aspects, the TX MIMO processor 1420 applies beam-forming weights to the symbols of the data streams and to the antenna from which the symbol is being transmitted.

Each transceiver 1422 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1422A through 1422T are then transmitted from $N_T$ antennas 1424A through 1424T, respectively.

At the device 1450, the transmitted modulated signals are received by $N_R$ antennas 1452A through 1452R and the received signal from each antenna 1452 is provided to a respective transceiver ("XCVR") 1454A through 1454R. Each transceiver 1454 conditions (e.g., filters, amplifies, and downconverts) a respective received signal, digitizes the conditioned signal to provide samples, and further processes the samples to provide a corresponding "received" symbol stream.

A receive ("RX") data processor 1460 then receives and processes the $N_R$ received symbol streams from $N_R$ transceivers 1454 based on a particular receiver processing technique to provide $N_T$ "detected" symbol streams. The RX data processor 1460 then demodulates, deinterleaves, and decodes each detected symbol stream to recover the traffic data for the data stream. The processing by the RX data processor 1460 is complementary to that performed by the TX MIMO processor 1420 and the TX data processor 1414 at the device 1410.

A processor 1470 periodically determines which pre-coding matrix to use (discussed below). The processor 1470 formulates a reverse link message comprising a matrix index portion and a rank value portion. A data memory 1472 may store program code, data, and other information used by the processor 1470 or other components of the device 1450.

The reverse link message may comprise various types of information regarding the communication link and/or the received data stream. The reverse link message is then processed by a TX data processor 1438, which also receives traffic data for a number of data streams from a data source 1436, modulated by a modulator 1480, conditioned by the transceivers 1454A through 1454R, and transmitted back to the device 1410.

At the device 1410, the modulated signals from the device 1450 are received by the antennas 1424, conditioned by the transceivers 1422, demodulated by a demodulator ("DE-MOD") 1440, and processed by a RX data processor 1442 to extract the reverse link message transmitted by the device 1450. The processor 1430 then determines which pre-coding matrix to use for determining the beam-forming weights then processes the extracted message.

FIG. 14 also illustrates that the communication components may include one or more components that perform interference control operations as taught herein. For example, an interference ("INTER.") control component 1490 may cooperate with the processor 1430 and/or other components of the device 1410 to send/receive signals to/from another device (e.g., device 1450) as taught herein. Similarly, an interference control component 1492 may cooperate with the processor 1470 and/or other components of the device 1450 to send/receive signals to/from another device (e.g., device 1410). It should be appreciated that for each device 1410 and 1450 the functionality of two or more of the described components may be provided by a single component. For example, a single processing component may provide the functionality of the interference control component 1490 and the processor 1430 and a single processing component may provide the functionality of the interference control component 1492 and the processor 1470.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for utilizing cell information provisioned to a mobile device, comprising:
    obtaining cell information that includes network information, deployment information and cell characteristic information of one or more cells within at least one network, wherein the cell information further provides mappings between the network information, the deployment information, and the cell characteristic information;
    retaining the cell information in a memory;
    employing the cell information to facilitate discovery of cell characteristics associated with at least one detected cell;
    determining an identity of one of the at least one network; and
    querying, according to the identity of the at least one network and independent of the deployment information, to obtain deployment information of the one network and of the cell characteristics associated with the cells in the one network.

2. The method of claim 1, further comprising:
    determining location information associated with the mobile device, wherein the location information indicates a geographical location of the mobile device; and
    querying the cell information with the location information to obtain deployment information and cell characteristic information associated with cells in proximity to the geographical location indicated by the location information.

3. The method of claim 1, further comprising analyzing a signal transmitted by a base station to determine one or more properties of the base station, wherein the one or more properties include at least one of a frequency employed by the base station, a pseudo-random noise offset employed by the base station or a scrambling code employed by the base station.

4. The method of claim 3, further comprising:
    comparing the one or more properties with deployment information included in the cell information; and
    identifying cell characteristics of the base station based upon cell characteristic information included in the cell information mapped to deployment information matching the one or more properties.

5. The method of claim 1, further comprising attempting acquisition of the at least one detected cell when the cell characteristics of the at least one detected cell indicate improved service capabilities, wherein acquisition comprises at least one of an initial cell selection or an initiation of a handoff.

6. The method of claim 1, further comprising disregarding strong signals received from the at least one detected cell based upon discovered cell characteristics.

7. The method of claim 1, wherein the network information specifies at least one of a system identification number, a network identification number, a mobile country code, a mobile network code, a public land mobile network, or a location area.

8. The method of claim 1, wherein the deployment information specifies at least one of a pseudorandom noise offset, a scrambling code, a synchronization code, a physical cell identity, a band class, a channel number, or a frequency.

9. The method of claim 1, wherein the cell characteristic information specifies at least one of a coverage area of a cell, a transmit power of a cell, whether a cell has an open or closed association, or whether a cell is one of a femtocell or macrocell.

10. The method of claim 1, wherein obtaining the cell information comprises receiving the deployment information via a provisioning mechanism.

11. The method of claim 10, wherein the provisioning mechanism comprises an over-the-air provisioning mechanism.

12. The method of claim 10, wherein the provisioning mechanism comprises a download of cell information via an internet protocol network.

13. The method of claim 10, wherein the provisioning mechanism comprises a computer-readable storage medium that retains the cell information.

14. The method of claim 1, wherein obtaining the cell information comprises receiving the cell information over at least one of a control channel or a broadcast channel.

15. The method of claim 1, further comprising:
    detecting a cell not included in the cell information; and
    adding at least one of network information, deployment information, or cell characteristic information associated with the cell to the cell information.

16. An apparatus, comprising:
    a receive module that acquires cell information, wherein the cell information includes network information, deployment information and cell characteristic information of one or more cells within at least one network, wherein the cell information further provides mappings between the network information, the deployment information, and the cell characteristic information;
    a cell evaluation module that utilizes the cell information to facilitate discovery of cell characteristics associated with the one or more cells based at least in part on characteristics of received signals from the one or more cells, the cell evaluation module correlates characteristics of received signals to network information, deployment information and cell characteristic information specified in the cell information;
    a network identification module that determines an identity of one of the at least one network;
    a pilot information module that evaluates received signals from one or more base stations to determine characteristics, the characteristics include at least one of a frequency band, a pseudorandom noise offset, or a synchronization code; and
    a lookup module that filters the cell information by the identity of the at least one network and independent of the deployment information.

17. The apparatus of claim 16, further comprising an intelligence module that supplements the cell information upon identification of a base station not included in the cell information.

18. The apparatus of claim 16, further comprising a location module that determines location information associated with the apparatus, wherein the location information is employed to filter the cell information to identify cells in proximity to a location specified by the location information.

19. A wireless communication apparatus, comprising:
means for obtaining cell information that includes network information, deployment information and cell characteristic information of one or more cells within at least one network, wherein the cell information further provides mappings between the network information, the deployment information, and the cell characteristic information;
means for storing the cell information;
means for employing the cell information to identify cell characteristics associated with at least one detected cell;
means for determining an identity of one of the at least one network; and
means for querying, according to the identity of the at least one network and independent of the deployment information, to obtain deployment information of the one network and of the cell characteristics associated with the cells in the one network.

20. The wireless communication apparatus of claim 19, further comprising:
means for determining location information associated with a mobile device, wherein the location information indicates a geographical location of the mobile device; and
means for querying the cell information with the location information to obtain deployment information and cell characteristic information associated with cells in proximity to the geographical location indicated by the location information.

21. The wireless communication apparatus of claim 19, further comprising means for analyzing a signal transmitted by a base station to determine one or more properties of the base station, wherein the one or more properties include at least one of a frequency employed by the base station, a pseudo-random noise offset employed by the base station or a scrambling code employed by the base station.

22. The wireless communication apparatus of claim 21, further comprising:
means for comparing the one or more properties with deployment information included in the cell information; and
means for identifying cell characteristics of the base station based upon cell characteristic information included in the cell information mapped to deployment information matching the one or more properties.

23. The wireless communication apparatus of claim 19, further comprising means for attempting acquisition of the at least one detected cell when the cell characteristics of the at least one detected cell indicate improved service capabilities, wherein acquisition comprises at least one of an initial cell selection or an initiation of a handoff.

24. The wireless communication apparatus of claim 19, further comprising means for disregarding strong signals received from the at least one detected cell based upon discovered cell characteristics.

25. The wireless communication apparatus of claim 19, wherein the network information specifies at least one of a system identification number, a network identification number, a mobile country code, a mobile network code, a public land mobile network, or a location area.

26. The wireless communication apparatus of claim 19, wherein the deployment information specifies at least one of a pseudorandom noise offset, a scrambling code, a synchronization code, a physical cell identity, a band class; a channel number, or a frequency.

27. The wireless communication apparatus of claim 19, wherein the cell characteristic information specifies at least one of a coverage area of a cell, a transmit power of a cell, whether a cell has an open or closed association, or whether a cell is one of a femtocell or macrocell.

28. The wireless communication apparatus of claim 19, wherein the means for obtaining the cell information comprises means for receiving the deployment information via a provisioning mechanism.

29. The wireless communication apparatus of claim 28, wherein the provisioning mechanism comprises an over-the-air provisioning mechanism.

30. The wireless communication apparatus of claim 28, wherein the provisioning mechanism comprises a download of cell information via an internet protocol network.

31. The wireless communication apparatus of claim 28, wherein the provisioning mechanism comprises a computer-readable storage medium that retains the cell information.

32. The wireless communication apparatus of claim 19, wherein the means for obtaining the cell information comprises means for receiving the cell information over at least one of a control channel or a broadcast channel.

33. The wireless communication apparatus of claim 19, further comprising:
means for detecting a cell not included in the cell information; and
means for adding at least one of network information, deployment information, or cell characteristic information associated with the cell to the cell information.

34. A computer program product, comprising:
a non-transitory computer-readable medium, comprising:
code for causing at least one computer to acquire cell information from at least one base station via over-the-air provisioning, wherein the cell information includes network information, deployment information and cell characteristic information of one or more cells within at least one network, wherein the cell information further provides mappings between the network information, the deployment information, and the cell characteristic information;
code for causing at least one computer to retain the cell information;
code for causing at least one computer to analyze a signal from a base station to determine one or more properties of the base station;
code for causing at least one computer to: correlate the one or more properties of the base station with the cell information to identify cell characteristics associated with the base station;
code for causing at least one computer to determine an identity of one of the at least one network; and
code for causing at least one computer to correlate the one or more properties of the base station with the cell information based at least in part on the identity of the one network and independent of the deployment information.

35. The computer program product of claim 34, wherein the non-transitory computer-readable medium further comprises:
code for causing at least one computer to determine location information associated with a mobile device; and
code for causing at least one computer to correlate the one or more properties of the base station with the cell information based at least in part on the location information.

36. The computer program product of claim 34, wherein the network information specifies at least one of a system identification number, a network identification number, a mobile country code, a mobile network code, a public land mobile network, or a location area.

37. The computer program product of claim 34, wherein the deployment information specifies at least one of a pseudorandom noise offset, a scrambling code, a synchronization code, a physical cell identity, a band class, a channel number, or a frequency.

38. The computer program product of claim 34, wherein the cell characteristic information specifies at least one of a coverage area of a cell, a transmit power of a cell, whether a cell has an open or closed association, or whether a cell is one of a femtocell or macrocell.

39. A wireless communication apparatus, comprising:
a processor configured to:
   obtain cell information includes network information, deployment information and cell characteristic information of one or more cells within at least one network, wherein the cell information further provides mappings between the network information, the deployment information;
   store the cell information in a memory;
   utilize the cell information to discover cell characteristics associated with at least one detected cell;
   determine an identity of one of the at least one network; and
   query, according to the identity of the at least one network and independent of the deployment information, to obtain deployment information of the one network and of the cell characteristics of one or more cells associated with the one network.

40. The wireless communication apparatus of claim 39, wherein the processor is further configured to:
   determine location information associated with a mobile device; and
   query the cell information with the location information to obtain deployment information and cell characteristics of one or more cells in proximity to a location specified by the location information.

41. The wireless communication apparatus of claim 39, wherein the network information specifies at least one of a system identification number, a network identification number, a mobile country code, a mobile network code, a public land mobile network, or a location area.

42. The wireless communication apparatus of claim 39, wherein the deployment information specifies at least one of a pseudorandom noise offset, a scrambling code, a synchronization code, a physical cell identity, a band class, a channel number, or a frequency.

43. The wireless communication apparatus of claim 39, wherein the cell characteristic information specifies at least one of a coverage area of a cell, a transmit power of a cell, whether a cell has an open or closed association, or whether a cell is one of a femtocell or macrocell.

* * * * *